United States Patent
Eckerdal et al.

(10) Patent No.: US 11,677,800 B2
(45) Date of Patent: *Jun. 13, 2023

(54) SYSTEM AND METHOD FOR USE OF CYCLIC PLAY QUEUES IN A MEDIA CONTENT ENVIRONMENT

(71) Applicant: Spotify AB, Stockholm (SE)

(72) Inventors: Per Eckerdal, Stockholm (SE); Johan Lindström, Stockholm (SE); Emil Eriksson, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,298

(22) Filed: Dec. 17, 2021

(65) Prior Publication Data

US 2022/0174106 A1 Jun. 2, 2022

Related U.S. Application Data

(63) Continuation of application No. 16/816,088, filed on Mar. 11, 2020, now Pat. No. 11,240,281, which is a (Continued)

(51) Int. Cl.
*H04L 65/75* (2022.01)
*H04N 21/43* (2011.01)
(Continued)

(52) U.S. Cl.
CPC ............ *H04L 65/75* (2022.05); *G06F 3/0482* (2013.01); *G06F 3/04842* (2013.01);
(Continued)

(58) Field of Classification Search
CPC ... H04L 65/75; G06F 3/0482; G06F 3/04842; H04N 21/4302; H04N 21/4825; H04N 21/8402

See application file for complete search history.

(56) References Cited

U.S. PATENT DOCUMENTS 8,510,847 B2   8/2013   Knight
8,725,740 B2   5/2014   Amidon
(Continued)

FOREIGN PATENT DOCUMENTS

WO    WO2017153435    9/2017

OTHER PUBLICATIONS

Jimmy Mardell, "Playlists at Spotify—Using Cassandra to store version controlled objects at large scale", Cassandra Summit Europe 2013, London, UK, Oct. 17, 2013, 38 pages. (Year: 2013).*

(Continued)

*Primary Examiner* — Patrice L Winder
(74) *Attorney, Agent, or Firm* — Morgan, Lewis & Bockius LLP

(57) ABSTRACT

An electronic device, while providing a first playlist for playback by a media device, maintains a play queue for a first user that is initially populated with a list of media content items to be played by the media device, the initially populated list of media content items including media content items distinct from the first playlist and selected by the first user and media content items from the first playlist. The electronic device receives a request to change playback from the first playlist to a second playlist different from the first playlist. In response to the request to change the playback from the first playlist to the second playlist, the electronic device maintains, in the play queue, the media content items selected by the first user while changing playback from the first playlist to the second playlist.

15 Claims, 8 Drawing Sheets

Related U.S. Application Data continuation of application No. 15/065,737, filed on Mar. 9, 2016, now Pat. No. 10,623,459.

(51) Int. Cl.
    *H04N 21/84*     (2011.01)
    *H04N 21/482*    (2011.01)
    *G06F 3/0482*    (2013.01)
    *G06F 3/04842*   (2022.01)

(52) U.S. Cl.
    CPC ..... *H04N 21/4302* (2013.01); *H04N 21/4825* (2013.01); *H04N 21/8402* (2013.01)

(56) References Cited

U.S. PATENT DOCUMENTS

| | | | |
|---|---|---|---|
| 8,983,905 | B2 | 3/2015 | Alsina |
| 9,021,355 | B2* | 4/2015 | Salyards ............... G06F 3/0482 |
| | | | 715/716 |
| 9,355,100 | B2 | 5/2016 | Rauber |
| 9,367,883 | B2 | 6/2016 | Sokolov |
| 10,114,689 | B1* | 10/2018 | Yang ................... G06F 11/0751 |
| 2008/0244644 | A1 | 10/2008 | McCausland |
| 2009/0059512 | A1 | 3/2009 | Lydon |
| 2009/0313432 | A1 | 12/2009 | Spence |
| 2010/0114979 | A1* | 5/2010 | Petersen ............. G06F 16/4387 |
| | | | 707/E17.032 |
| 2011/0022593 | A1 | 1/2011 | Ku |
| 2012/0203796 | A1 | 8/2012 | Abraham |
| 2013/0081084 | A1* | 3/2013 | Scheer ................. H04N 21/252 |
| | | | 725/46 |
| 2013/0263049 | A1 | 10/2013 | Lehtiniemi |
| 2013/0325807 | A1* | 12/2013 | Sokolov ................... G06F 16/27 |
| | | | 707/638 |
| 2014/0031961 | A1 | 1/2014 | Wansley |
| 2014/0123005 | A1* | 5/2014 | Forstall ................... G06F 16/44 |
| | | | 715/716 |
| 2014/0310316 | A1 | 10/2014 | Coburn |
| 2014/0324201 | A1* | 10/2014 | Coburn, IV ............ G06F 16/60 |
| | | | 700/94 |
| 2015/0169581 | A1 | 6/2015 | Pusateri |
| 2015/0177926 | A1 | 6/2015 | Rivera |
| 2015/0213018 | A1* | 7/2015 | Sanio .................. G06F 16/4387 |
| | | | 707/802 |
| 2016/0162125 | A1 | 6/2016 | Martella |
| 2017/0169858 | A1* | 6/2017 | Lee .................. H04N 21/41407 |
| 2017/0371882 | A1 | 12/2017 | Zhao |

OTHER PUBLICATIONS

Merge (version control)—Wikipedia, https:jjen.wikipedia.orgjwjindex. php?title=Merge(version control) 3iOldid=687622915, Oct. 26, 2015, 6 pages. (Year: 2015).*

International Search Report and Written Opinion issued by European Patent Office for PCT Application No. PCT/EP2017/055366, dated Apr. 1, 20179, 14 pgs.

International Preliminary Report on Patentability, PCT/EP2017/055366, dated Sep. 11, 2018, 9 pgs.

European Patent Office, Communication of the European Publication Number, in connection with International Application No. PCTZEP2017/055366 and European Application No. 17709937.1 (EP3427487), dated Dec. 19, 2018, 1 pg.

European Patent Office, Communication pursuant to Article 94(3) EPC for European Patent Application No. 17709937.1 dated Dec. 4, 2019, 5 pgs.

Eckerdal, Office Action, U.S. Appl. No. 15/065,737, dated Apr. 20, 2018, 24 pgs.

Eckerdal, Final Office Action, U.S. Appl. No. 115/065,737, dated Feb. 25, 2019, 12 pgs.

Eckerdal, Notice of Allowance, U.S. Appl. No. 15/065,737, dated Dec. 9, 2019, 14 pgs.

Eckerdal, Office Action, U.S. Appl. No. 16/816,088, dated Apr. 1, 2021, 24 pgs.

Eckerdal, Notice of Allowance, U.S. Appl. No. 16/816,088, dated Sep. 22, 2021, 11 pgs.

Jimmy Mardell, "Playlist at Spotify—Using Cassandra to store version controlled objects at large scale," Cassandra Summit Europe 2013, London, UK, Oct. 17, 2013, 38 pgs. (Year: 2013).

"Merge (version control)—Wikipedia," https:jjen.wikipedia. orgjwjindex.php?title_Merge(version conrol) 3iOldid=687622915, Oct. 26, 2015, 6 pgs. (Year: 2015).

* cited by examiner

SYSTEM AND METHOD FOR USE OF CYCLIC PLAY QUEUES IN A MEDIA CONTENT ENVIRONMENT

CLAIM OF PRIORITY

This application is a continuation of U.S. patent application Ser. No. 16/816,088, titled "SYSTEM AND METHOD FOR USE OF CYCLIC PLAY QUEUES IN A MEDIA CONTENT ENVIRONMENT", filed Mar. 11, 2020, which is a continuation of U.S. patent application Ser. No. 15/065,737, titled "SYSTEM AND METHOD FOR USE OF CYCLIC PLAY QUEUES IN A MEDIA CONTENT ENVIRONMENT", filed Mar. 9, 2016, now U.S. Pat. No. 10,623,459; each of which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to the providing of media content, or other types of data, and are particularly related to a system and method for use of cyclic play queues in a media content environment.

BACKGROUND

Today's consumers enjoy the ability to access a tremendous amount of media content, such as music and videos, at any location or time of day, using a wide variety of media devices.

In some media content environments which recognize playlists of various items of media content, for example playlists of music tracks, a play queue can be used to maintain a list of those items of media content which a user is about to hear next. Typically, the play queue can be directly managed by the user, for example by selecting an "add to play queue" option for a particular item; or can be automatically managed, for example by the user selecting a particular playlist, which may itself be curated by another user, such that all of that playlist's elements are automatically added to the play queue.

However, some play queue implementations may restrict the ability of the user to make certain changes to the play queue, for example to arrange items in a desired order. These are some examples of the types of environments in which embodiments of the invention can be used.

SUMMARY

In accordance with an embodiment, described herein is a system and method for use of cyclic play queues in a media content environment. A cyclic list data structure that can be initially populated with a list of media content items to be played at a media device, exposes a cyclic list of sequences of media content items, and supports operations to modify portions of the cyclic list to provide a cyclic play queue of media content items. When changes are made to an underlying play queue or context, the system performs a three-way merge of sequences of media content items within the cyclic list, to provide a modified play queue, for example with the left sequence being an updated playlist, and the right sequence being a patch window that reflects a user's changes to the play queue.

DETAILED DESCRIPTION

Figure 1:
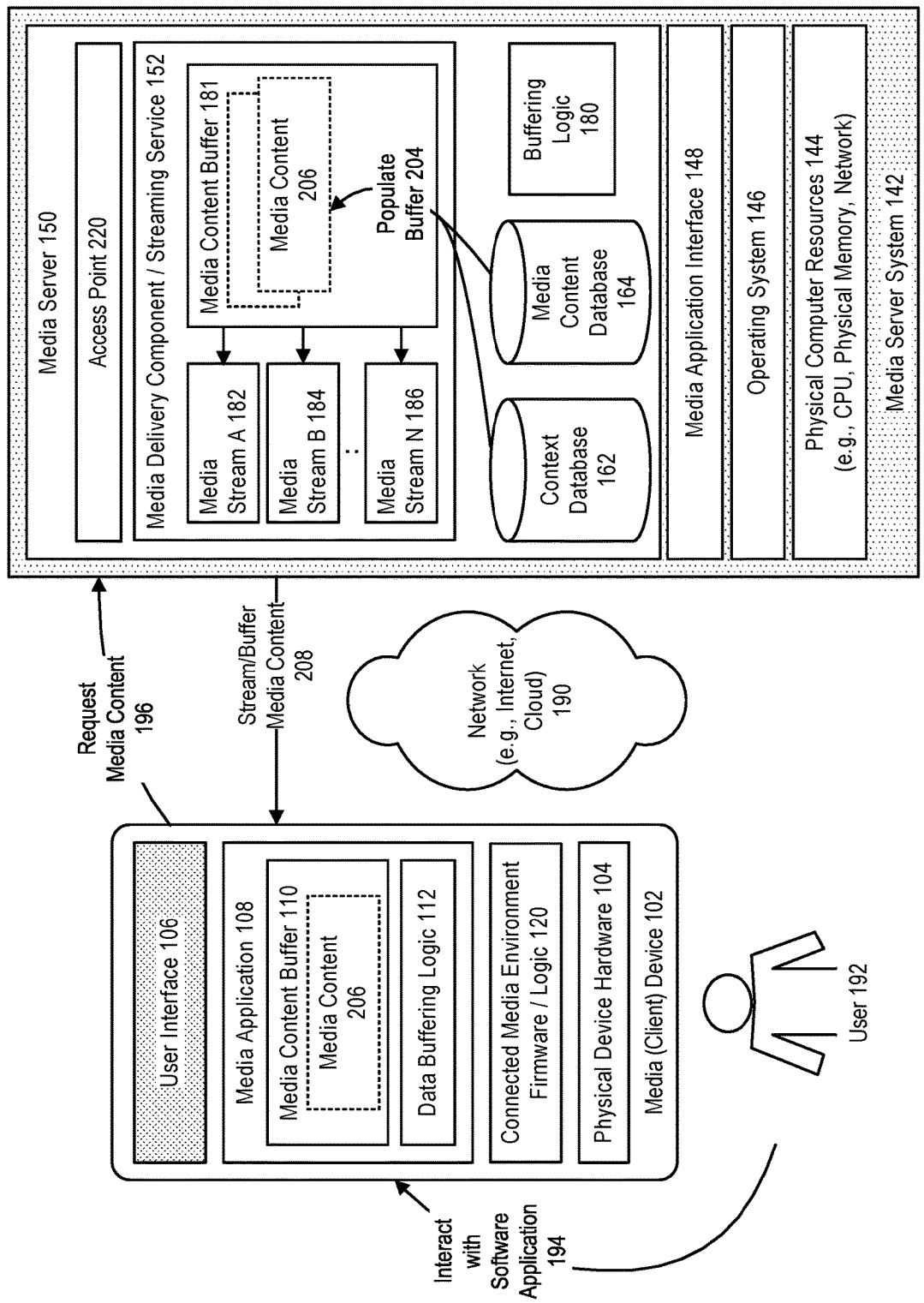
FIG. 1 illustrates an example of a system for providing media content, in accordance with an embodiment.

As described above, in some media content environments which recognize playlists of various items of media content, for example playlists of music tracks (generally referred to herein as tracks), a play queue can be used to maintain a list of those items of media content which a user is about to hear next.

Typically, the play queue can be directly managed by the user, for example by selecting an "add to play queue" option for a particular item; or can be automatically managed, for example by the user selecting a particular playlist, which may itself be curated by another user, such that all of that playlist's elements are automatically added (referred to herein in some instances as a context) to the play queue. However, some play queue implementations may restrict the ability of the user to make certain changes to the play queue, for example to arrange items in a desired order.

To address this, in accordance with an embodiment, described herein is a system and method for use of cyclic play queues in a media content environment. A cyclic list data structure that can be initially populated with a list of media content items to be played at a media device, exposes a cyclic list of sequences of media content items, and supports operations to modify portions of the cyclic list to provide a cyclic play queue of media content items. When changes are made to an underlying play queue or context, for example as a result of an update to a playlist, when shuffle is enabled or disabled, or the playlist is sorted or filtered, the system performs a three-way merge of sequences of media content items within the cyclic list, to provide a modified play queue, for example with the left sequence being an updated playlist, and the right sequence being a patch window that reflects a user's changes to the play queue.

In accordance with an embodiment, the system comprises a media device, that operates as a client device and includes a processor, and that can receive and play media content provided by a media server, or by another system or peer device; a user interface provided at the media device, that enables a user to select from a plurality of displayed media options to be played at the device, wherein each media option corresponds to a media content item; and a player logic and cyclic list data structure that can be initially populated with a list of media content items to be played at the media device, wherein the cyclic list exposes a continuous list of sequences of media content items, and supports operations to modify portions of the cyclic list to provide a cyclic play queue of media content items; whereupon changes being made to an underlying play queue, the system performs a three-way merge of sequences of media content items within the cyclic list to provide a modified play queue of media content items.

In accordance with an embodiment, each of the media options is associated with a media content item that is one of a song, music, video, or other type of media content.

In accordance with an embodiment, the system further comprises a queue API or other interface, which allows operations to be performed that include modifications of previous and/or next tracks within the cyclic list associated with a modified play queue of media content items.

In accordance with an embodiment, the player logic supports the use of a patch operation that replaces a particular sequence instance of the cyclic list with a different sequence of elements.

In accordance with an embodiment, the player logic supports the use of an update operation that replaces an underlying vector of media content items while retaining made using the patch operation.

The above and additional embodiments are described in further detail below.

Media Content Environment

FIG. 1 illustrates an example of a system for providing media content, in accordance with an embodiment.

As illustrated in FIG. 1, in accordance with an embodiment, a media device 102, operating as a client device, can receive and play media content provided by a backend media server system 142 (media server), or by another system or peer device. In accordance with an embodiment, the client device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a software media application 108, together with an in-memory client-side media content buffer 110, and a data buffering logic or component 112, which can be used to control the playback of media content received from the media server, for playing either at a requesting client device (i.e., controlling device) or at a controlled client device (i.e., controlled device), in the manner of a remote control. A connected media environment firmware, logic or component 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment which supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling client device, and their audio speaker as a controlled client device to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination client device to which the media content is being streamed changes, from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client devices to search within repositories of media content, to locate particular media content items.

In accordance with an embodiment, a buffering logic or component 180 can be used to retrieve or otherwise access media content items, in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device, and issue requests to access media content, for example the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content, 206 including one or more streams of media content data, and can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a Spotify media content environment, most Spotify clients connect to various Spotify back-end processes via a Spotify "accesspoint", which forwards client requests to other servers, such as sending one or more metadataproxy requests to one of several metadataproxy machines on behalf of the client or end user.

Figure 2:
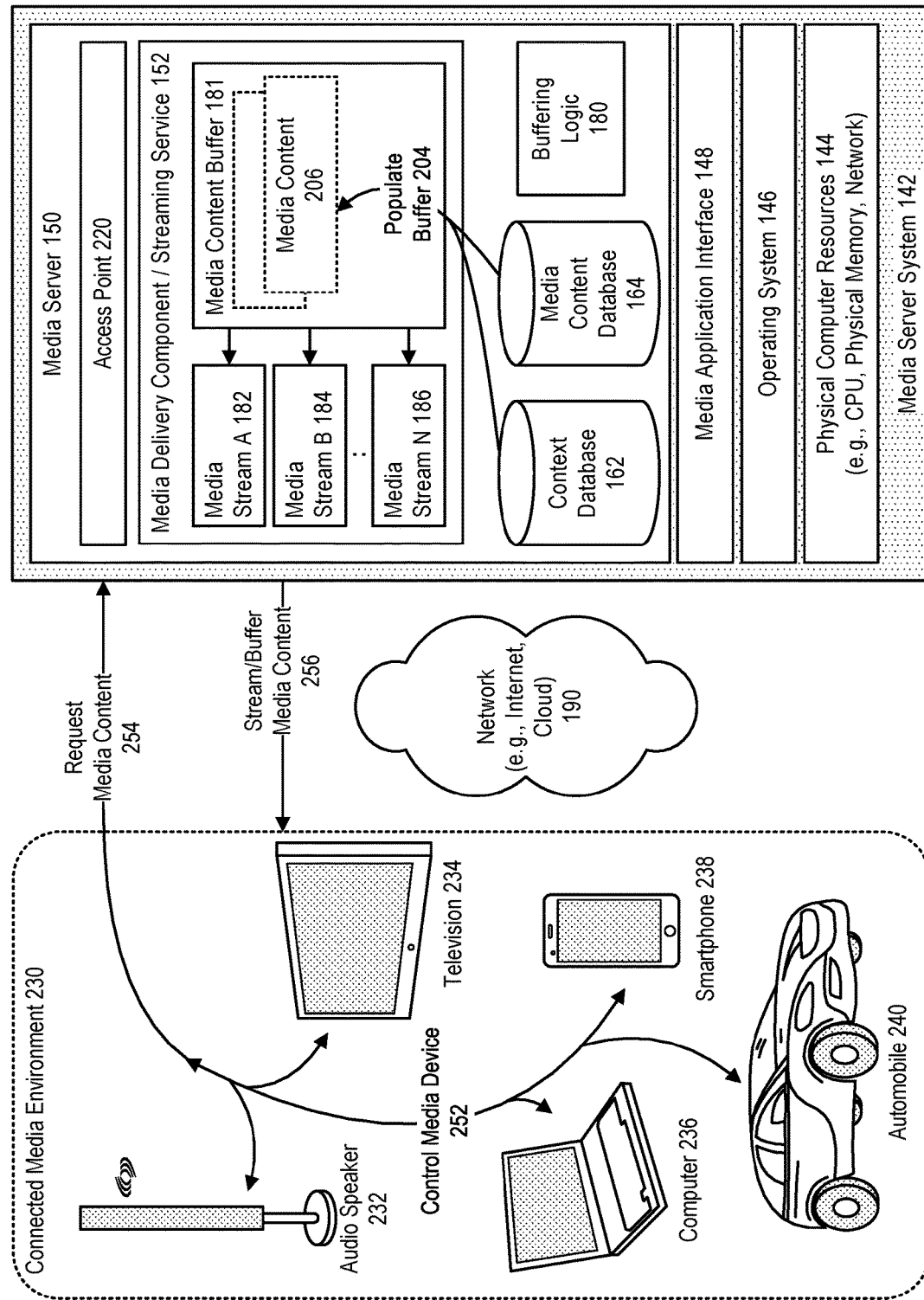
FIG. 2 further illustrates an example of a system for providing media content, in accordance with an embodiment.

FIG. 2 further illustrates an example of a system for providing media content, in accordance with an embodiment.

As illustrated in FIG. 2, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as a firmware logic or component, or within, for example, a separate set-top box or similar aftermarket device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
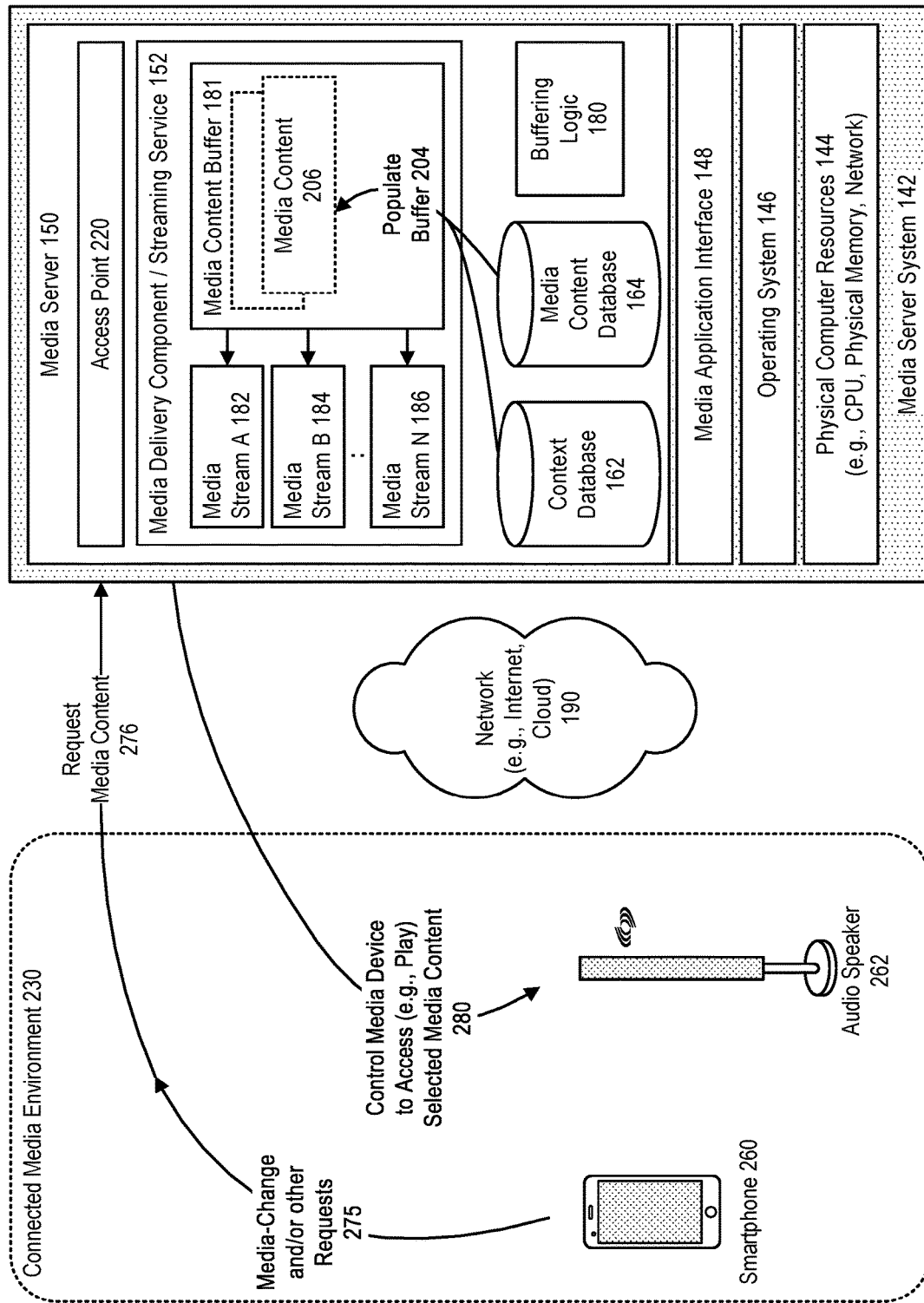
FIG. 3 further illustrates an example of a system for providing media content, in accordance with an embodiment.

FIG. 3 further illustrates an example of a system for providing media content, in accordance with an embodiment.

As illustrated in FIG. 3, a user can utilize, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

Cyclic Play Queue

As described above, in some media content environments which recognize playlists of various items of media content, for example playlists of tracks, a play queue can be used to maintain a list of those items of media content which a user is about to hear next.

Typically, the play queue can be directly managed by the user, for example by selecting an "add to play queue" option for a particular item; or can be automatically managed, for example by the user selecting a particular playlist, which may itself be curated by another user, such that all of that playlist's elements are automatically added as a context to the play queue.

A simple implementation of a play queue maintains a vector of tracks to play, so that, upon starting a particular playlist, that playlist is added to the vector; and when additional individual tracks are added, they are prepended to the vector.

However, this is not a satisfactory approach for users who wish to interact more with the play queue, without having to create complete playlists. For example, the simple implementation cannot address scenarios such as an underlying playlist changing; or the play queue being updated; or the user explicitly adding or moving a track to the queue; or how to present the queue if the underlying playlist is on repeat, shuffle, or unshuffle.

For example, in a Spotify media content environment, which supports the use of a Spotify client, tracks that are explicitly queued by a user for play are traditionally kept in a separate list from the remaining songs displayed in a "Play Queue" view, which allows a user to edit their list of explicitly queued tracks, but not the remaining tracks (in the context).

From a user perspective, it would be advantageous to be able to edit all of the tracks in a "Play Queue" view, including those provided by the context. For example, the user might not want to hear a particular track; or may want to add a particular track to the play queue following those tracks already in the queue; or may want to change the order that different tracks will be played, for example to hear the contents of a music album in a different order.

However, an underlying playlist, particularly one curated by another user, may change at any time, which means that the system should account for events such as, for example, a user queueing a track and then adding another track in front of the current track, to examine which one should be played first; or the user moving a track in their play queue and then moves that same track in the playlist; or the user shuffles and then moves some tracks, and then unshuffles.

For example, if the user desires to listen to a 20 track-long playlist, and is currently listening to the 19th track of the playlist, it limits the user experience if they are only allowed to edit the 20th track; which is especially frustrating if repeat is enabled, such that more tracks will actually be played.

To address this, in accordance with an embodiment, described herein is a system and method for use of cyclic play queues in a media content environment. A cyclic list data structure that can be initially populated with a list of media content items to be played at a media device, exposes a cyclic list of sequences of media content items, and supports operations to modify portions of the cyclic list to provide a cyclic play queue of media content items. When changes are made to an underlying play queue or context, for example as a result of an update to a playlist, when shuffle is enabled or disabled, or the playlist is sorted or filtered, the system performs a three-way merge of sequences of media content items within the cyclic list, to provide a modified play queue, for example with the left sequence being an updated playlist, and the right sequence being a patch window that reflects a user's changes to the play queue.

In accordance with an embodiment, the system allows a user to display more than one iteration or sequence of a currently playing set of tracks. For example, in the Spotify "Play Queue" view environment described above, the system can allow the user to display the 19th track as the current track; then the 20th track, then the 1st track, then the 2nd track, and so on. Since the system displays multiple iterations of the set of tracks that are played, it can also handle situations when the user moves a track between two different iterations, for example, by moving the 20th track to a location following the 2nd track.

In accordance with an embodiment, an API or interface associated with the cyclic list data structure supports operations to modify portions of the cyclic list to provide a cyclic play queue of media content items, including for example, an update operation to change the underlying list of tracks when an underlying playlist changes; and a patch operation to replace an arbitrary range of tracks with other tracks when the user manipulates the play queue or when moving tracks between iterations or sequences of the underlying playlist.

Figure 4:
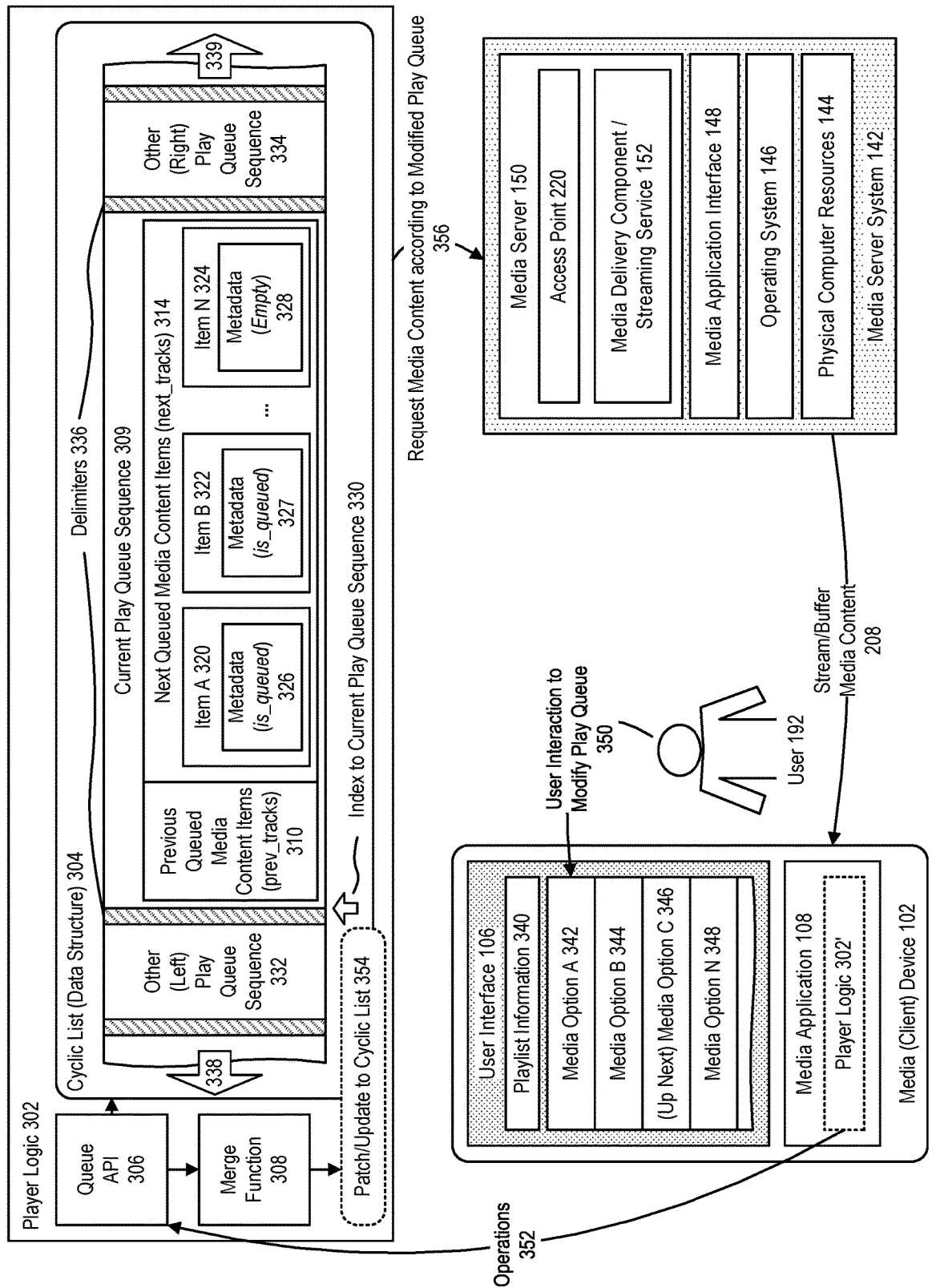
FIG. 4 illustrates a system for use of cyclic play queues in a media content environment, in accordance with an embodiment.

FIG. 4 illustrates a system for use of cyclic play queues in a media content environment, in accordance with an embodiment.

Although the various examples provided below describe the use of the system and methods in queuing and playing music tracks, these are provided for purposes of illustrating various exemplary embodiments that can use a cyclic play queue. In accordance with other embodiments, the systems and methods described herein can be similarly used with other types of media content, for example with songs, or with video media content data.

As illustrated in FIG. 4, in accordance with an embodiment, the media application at the media device can include a player logic or component 302 that receives input from a user, and determines an appropriate play queue of media content items to be retrieved from a media server.

In accordance with an embodiment, the player logic includes a cyclic list data structure 304, for example provided in memory, that can be initially populated with a list of media content items (e.g., songs, or tracks) to be played at a media device. The cyclic list exposes a continuous list of sequences of media content items (which initially can be simply the provided list of media content items, e.g., songs, or tracks, repeated over and over again), and supports operations to modify portions of the cyclic list to provide a cyclic play queue of media content items.

In accordance with an embodiment, a queue API or other interface 306 allows operations to be performed that include modifications of previous and/or next tracks within the cyclic list associated with a modified play queue of media content items. A merge function 308 allows the system upon changes being made to an underlying play queue, performing a three-way-merge of the cyclic list to provide the modified play queue of media content items.

As further illustrated in FIG. 4, in accordance with an embodiment, the cyclic list can include a set of previous queued media content items (prev_tracks) 310, and next queued media content items (next_tracks) 314, which in turn can indicate a plurality of media content items respectively already played, or to be played, including in this example media content items A 320, B 322, and N 324.

As described below, in accordance with an embodiment, particular media content items can be associated with metadata 326, 327, 328, which indicates whether the particular media content item has been queued by a user. An index 330 can be used to indicate the current play queue iteration or sequence of media content items to be played.

As further described below, in accordance with an embodiment, additional iterations or sequences, in this example indicated as (left) sequence 332, and (right) sequence 334, of previously and next queued media content items, can be included in the cyclic list, and separated by delimiters 336, so that the cyclic list can provide a list which appears to extend continuously or infinitely 338, 339 in each direction.

In accordance with an embodiment, the media device supports the display of information such as playlist information 340, and a plurality of media options, including in this example options A 342, B 344, and C 346 (which in this example is up next for playing, as described below), and N 348, and allows a user to interact with the user interface to modify a play queue 350. In response to a user modification of an underlying playlist or play queue, operations 352 are performed on the cyclic list, for example to patch and/or update 354 the cyclic list and provide a modified play queue, which can then be used to request media content from the media server according to the modified play queue 356.

Queue API

As described above, in a Spotify media content environment which supports use of a "Play Queue" view, the play queue is traditionally a sequence of tracks that can be modified and the sequence placed before upcoming tracks; including that when a track in the queue is played, it is removed from the queue.

For example, if a sequence of tracks is derived from an underlying playlist or context, including tracks Track0, Track1, and Track2; and a user add tracks Queue0, Queue1, and Queue2 to their play queue; then traditionally the upcoming tracks would appear as: Queue0, Queue1, Queue2, Track0, Track1, Track2, and cannot be readily rearranged by the user. As described above, these limitations stem from the fact that the context cannot be modified, and only the queued list is modifiable.

In accordance with an embodiment, the system includes a queue API or other interface, which helps avoid these limitations by allowing arbitrary modifications of the previous and next tracks, such as replacement of the entirety of the visible previously-queued tracks (prev_tracks), and/or subsequently or next-queued tracks (next_tracks). When the underlying context changes, changes from both the updated context and a modified previous and/or next sets of tracks can be merged. This allows the system to support use cases such as, for example, when a queued track is played, it is removed; or when another context is played, the queue is retained.

In accordance with an embodiment, to support this behavior, the queue API recognizes "up next" tracks, which are the prefix of consecutive tracks in next_tracks that have an "is_queued" metadata key set to true. To add tracks to "up next", the system can place those tracks first in next_tracks when setting the queue, and set their "is_queued" metadata key. This enables, for example, those user-added tracks to remain in the play queue, even when the user switches to a different playlist.

In accordance with an embodiment, a universal identifier or ID (UID) can be used to differentiate between duplicate tracks. For example, a playlist can include three instances of a particular song, which although the same song, will have different UIDs. To change the metadata of a context track, the context must be updated or that track replaced with a different track, for example by simply changing its UID. If the track is moved to "up next" by placing the track among the consecutive "is_queued" tracks, its original metadata is honored.

Merging Semantics

As described above, in accordance with an embodiment, the system can use a three-way merge algorithm or process, supported by the queue API or other interface, to address the fact that modifications can come in two forms: updates to the context and modification of the previous or next tracks.

In accordance with an embodiment, tracks are identified by their UID when merging, and the metadata of the track is not part of the merging. If the track has no UID, then a random one will be generated. Moving a track is equivalent to removing it, and then adding it somewhere else. If a track is either added or removed in the modified queue, then any changes to that track is ignored in context updates.

The above approach has some beneficial consequences, including that tracks are never duplicated (with regard to their UID). If both the context update and the queue modification adds a track, then, depending on the particular implementation, either the addition from the context update can be ignored; or alternatively the addition from the context update can be given precedence. The chosen approach can be used to resolve conflicts, for example, if a track is changed (added, removed or moved) in the modified queue, such that any changes (add, remove, or move) are ignored in context updates. If the modified queue and context update adds tracks at the same place, then all of the added tracks from one of them will come first, followed by all of the tracks of the other.

Cyclic List Operations

In accordance with an embodiment, the cyclic list includes data describing an underlying_vector of elements (items); the start (patch_start) and end (patch_end) indexes of the patch; and a vector of elements that contain the contents of the region specified by the start and end indexes, which has the length patch_size (patch).

Index Operation

In accordance with an embodiment, the index operation allows for reading from the cyclic list. Given an index which may be negative:

1. If index is <patch_start, then return the element in the underlying vector at index: index modulo the size of the underlying vector.

2. If index is >=patch_start of the patch but<patch_end, then return the element in the patch at index: index-patch_start.

3. If index is >=patch_end, then return the element in the underlying vector at index: patch_size-(patch_end-patch_size)+index module the size of the underlying vector. This adjusts for the fact that the patch may be larger than or smaller than the underlying region.

Patch Operation

In accordance with an embodiment, the patch operation replaces a region of the cyclic list with another sequence of elements. Given a statindex, an end_index and a new_patch:

1. If the current patch is empty, then set patch_start, patch_end, and patch to start_index, end_index, and new_patch respectively.

2. Otherwise expand the patch (in both directions if appropriate) so that both start_index and end_index is contained between patch_start and patch_end. Expanding the patch in a given direction (up or down) means appending the underlying element in the given direction and adjusting patch_end or patch_start so that it also covers that underlying element.

3. Remove the corresponding region from the current patch.

4. Insert new_patch in that place instead.

Update Operation

In accordance with an embodiment, the update operation replaces the underlying vector of tracks while still retaining the modifications made using the patch operation. Given a new_underlying vector of tracks:

1. Expand the patch, as described above, so that it covers an integral number of iterations of the underlying vector.
2. Repeat the new_underlying vector so that it covers the same number of iterations as the expanded patch does.
3. Repeat the existing underlying_vector so that it covers the same number of iterations as the expanded patch does.
4. Apply a three-way merge where the common ancestor is the repeated underlying_vector and the sequences to merge include the expanded patch and the repeated new_underlying. This becomes the new patch.
5. Replace the existing underlying_vector with the new_underlying vector.

In accordance with an embodiment, after both the update and patch operations, the patch can be also trimmed, which includes removing elements at both ends where they are the same as the underlying elements; and the patch_end and patch_start updated accordingly. This process is essentially the opposite of the expanding process.

EXAMPLE LIFECYCLES

Figure 5:
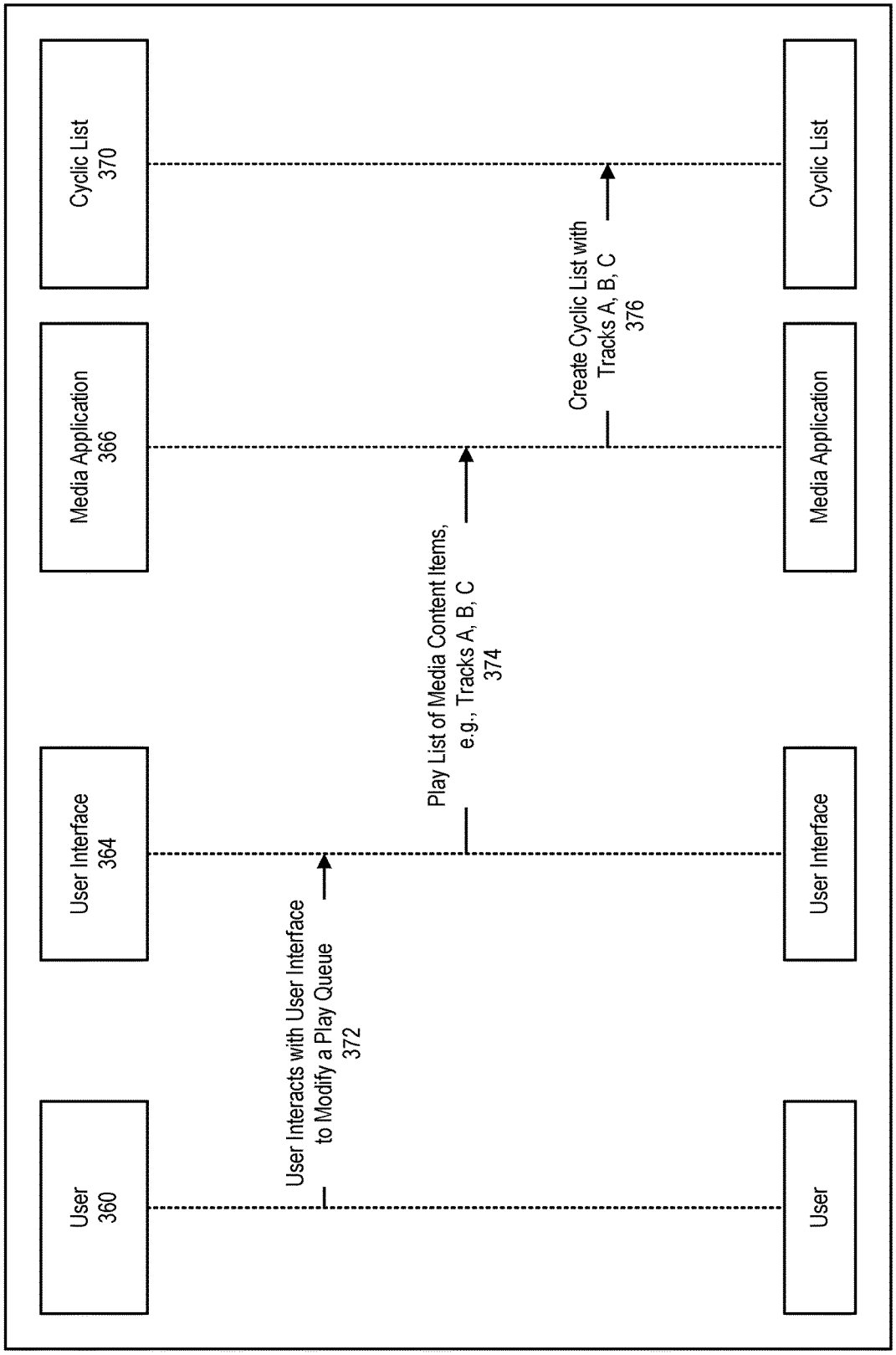
FIG. 5 illustrates an exemplary use of cyclic play queues in a media content environment, in accordance with an embodiment.

FIG. 5 illustrates an exemplary use of cyclic play queues in a media content environment, in accordance with an embodiment.

As illustrated in FIG. 5, in this example, a user 360 interacts with a user interface 364 and a media application 366, for example at a media device, to control the operation of a cyclic list 370. For example, the user can interact 372 with the user interface, to play 374 a list of Tracks A, B, and C; which causes the media application to create 376 an appropriate cyclic list iteration or sequence with Tracks A, B, and C.

Figure 6:
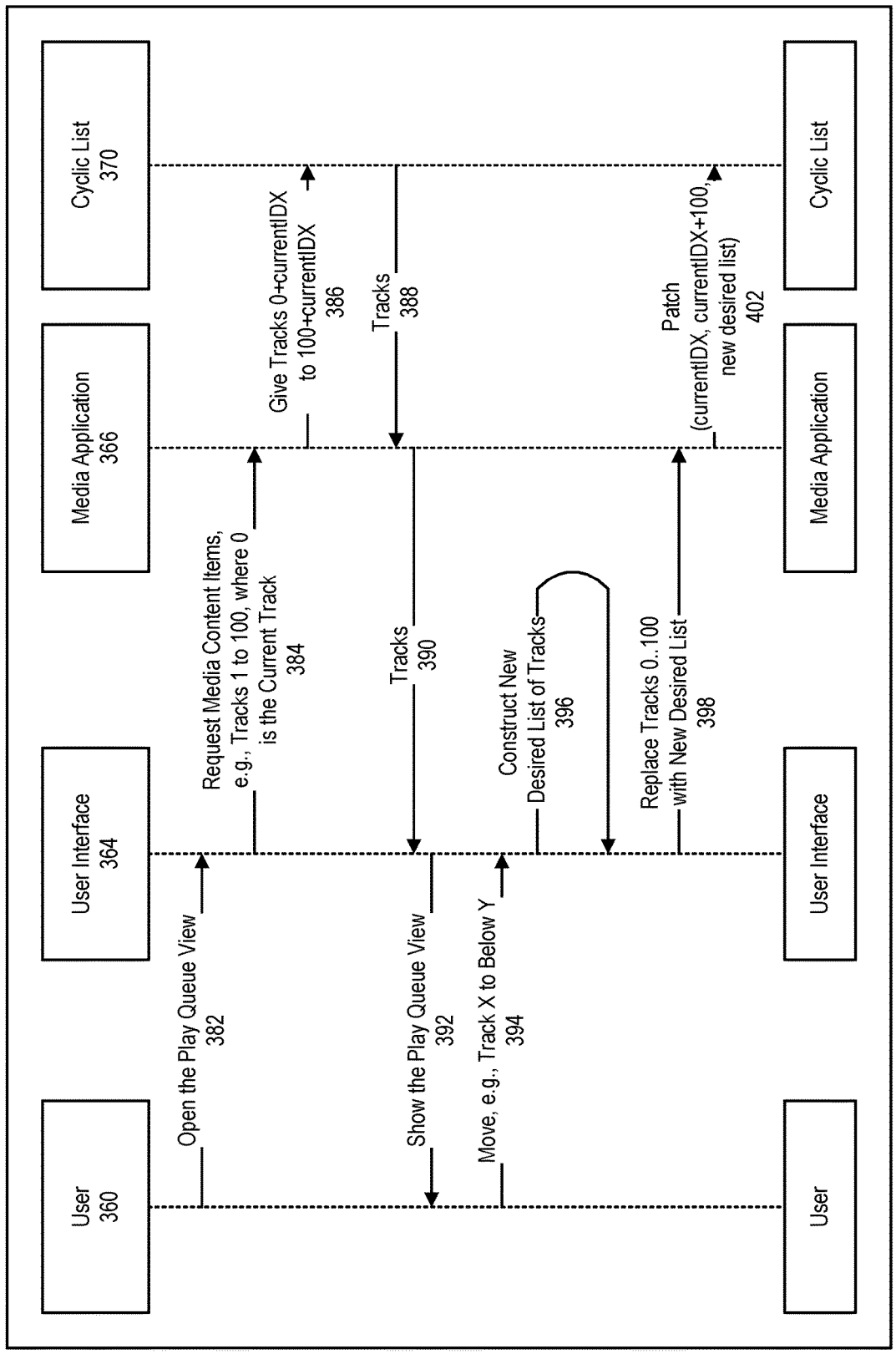
FIG. 6 further illustrates an exemplary use of cyclic play queues in a media content environment, in accordance with an embodiment.

FIG. 6 further illustrates an exemplary use of cyclic play queues in a media content environment, in accordance with an embodiment.

As illustrated in FIG. 6, in this example, a user again interacts with a user interface and a media application, to control the operation of a cyclic list. In this example, the user opens a queue view 382 (for example, using a "Play Queue" feature as described above), and, via the user interface requests 384 that the media player provide tracks 1 to 100, where 0 is the current track, in response to which the media application creates 386 a cyclic list iteration or sequence with Tracks 0+currentIDX to 100+currentIDX, which are then returned 388, 390 in order to populate 392 the displayed queue view.

If, for example, the user moves 394 Track X to below Track Y in their queue view, as displayed 396 on the user interface as a new desired list of tracks, then this request is passed 398 via the user interface to replace tracks 0 . . . 100 with the new desired list, which causes the media application to patch 402 the portion of the cyclic list at (currentIDX, currentIDX+100, new desired list).

Figure 7:
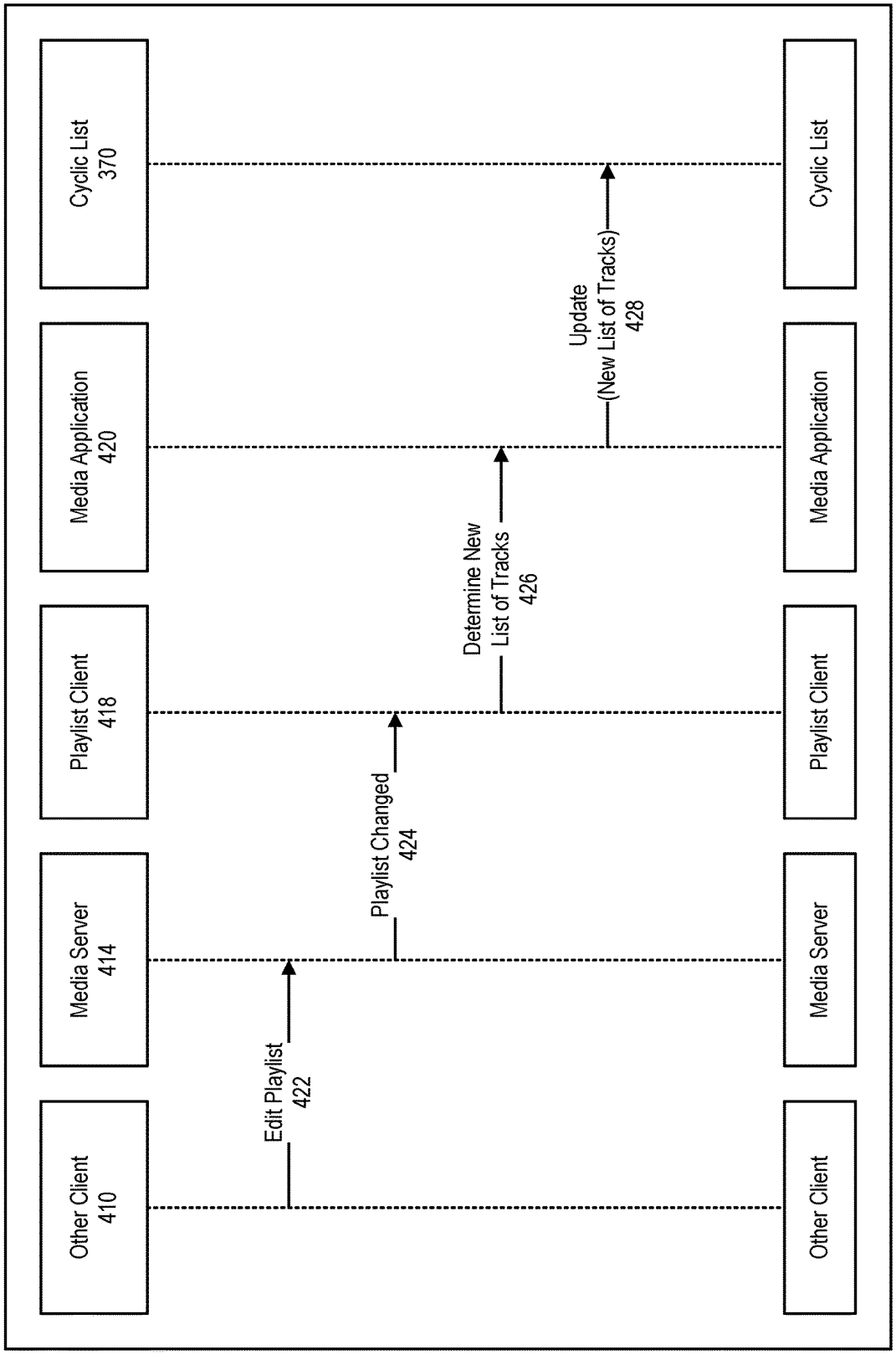
FIG. 7 further illustrates an exemplary use of cyclic play queues in a media content environment, in accordance with an embodiment.

FIG. 7 further illustrates an exemplary use of cyclic play queues in a media content environment, in accordance with an embodiment.

As illustrated in FIG. 7, in this example, another or different client 410 interacts with the media server backend 414, to modify an underlying playlist that is currently being accessed by a playlist client 418 having a media application 420 and access to a cyclic list 422. When the other or different client (410) edits 422 the playlist, the media server can indicate the change 424 to the playlist client (418), which instructs the media application to recognize the new list of tracks 426, and accordingly to update 428 the cyclic list with the new list of tracks.

Cyclic List Functions

Described below are examples of various cyclic list functions, which are provided for purposes of illustration, to illustrate an exemplary embodiment. In accordance with other embodiments, other types of functions can be used to provide a similar functionality.

In accordance with an embodiment, items can be retrieved as play queue iteration or sequences within the cyclic list that contain the actual elements together with an iteration number so it can be differentiated from other such instances. The cyclic list allows modifications to this view, and also allows for replacing an underlying repeated sequence while retaining the modifications made. This is achieved by applying a three-way merge algorithm, in which, for example, a patch method lets the client replace a range of instances with another sequence of instances that may be either longer or shorter than the original range. An update method updates the underlying sequence with different items and merges that with the changes made through the patch method. Each iteration or sequence within the cyclic list is separated by a delimiter item. By way of illustration, consider the following example:

```
var list = CyclicList([A, B, C])
// Add X at index 1
list.Patch(1, 1, X)
// Remove A and B
list.Update(C) // AXBC -> XC
// Add D after C
list.Update(CD) // XC -> ?
```

Intuitively, since we added D after C, we might expect the result to be XCD, but that would be incorrect. Since the cyclic list presents sequences of elements which effectively repeat continuously or infinitely in both directions, there is also a D added to the end of the iteration before and after. So, the merging is effectively a merging of CXC with CDCD, with CC as the common base. Both the patch and the update adds an item between the two C's, and the result of the merge operation is CXDCD. Removing the previous iteration leaves us with DCD, not XCD as we expected.

If we instead add a delimiter (e.g., "|"), we will be merging C|XC with CD|CD instead, making it clear that the D should be to the left of the delimiter, and X should be to the right of it. A side effect of using delimiters is that a cyclic list can be constructed from an empty sequence of items, in which case the view comprises infinitely repeating delimiters only.

Example 1 illustrates an exemplary function in accordance with an embodiment, which updates an underlying repeated sequence of items. Any changes made via the patch method is merged with the new items. If there is no current patch, there is no need to merge.

Example 1

```
func Update(items: [Item] ) {
    ExpandPatchToItemsBoundaries ()
    let delimItems = items + [delimiter]
    let iterations = DivideRoundUp(self.patchRange.count, self.items.count)
    let patchBegIteration = IterationForIndex(self.patchRange.begin)
    let patchEndIteration = IterationForIndex(self.patchRange.end)
```

Example 1

```
let original = InstantiateItems(self.items, patchBegIteration, iterations)
let newItems = InstantiateItems(delimItems, patchBegIteration,
   iterations)
self.items = delimItems
self.patch = Merge(original, newItems, self.patch)
self.patchRange = Range(
   patchBegIteration * self.items.count,
   patchEndIteration * self.items.count)
TrimPatch( )
}
```

Example 2 illustrates an exemplary function in accordance with an embodiment, which replaces a particular range with another sequence of instances. The range may span multiple iterations, and may be zero-sized to insert elements at a position. The new patch does not have to have the same length as the range, and may even be empty in order to remove all elements from the range. Tags can be used to indicate the start index of the range, and the end index of the range; and a vector of the instances to replace the range with.

Example 2

```
func Patch(range: Range, patch: [Instance] ) {
   // Expand self.patch to encompass the given patch range.
   // It is expanded by including Items from the underlying list.
   let rangeToReplace = ExpandPatchToRange(range)
   self.patch.Erase(rangeToReplace)
   self.patch.Insert(patch, atIndex: rangeToReplace.begin)
   TrimPatch( )
}
```

Example 3 illustrates an exemplary function in accordance with an embodiment, which returns an instance of the cyclic list at the given index. The first delimiter is (initially) located at an index, e.g., "size", where "size" is the number of elements in the underlying sequence. The function can also be used to searches for a given instance in this cyclic list wherein the instance tag is the instance to search for, and returns the index of the instance.

Example 3

```
func At(index: Int) -> Instance {
   if Index < self.patchRange.begin {
      return UnderlyingAt(index)
   } else if index - self.patchRange.begin < self.patch.count {
      return self.patch[index - self.patchRange.begin]
   } else {
      return UnderlyingAt(index + patchRange.count - self.patch.count)
   }
}
func Find(instance: Instance) -> Int? {
   if let index = self.patch.IndexOf(instance) {
      return Index + self.patchRange.begin
   }
   if let index = self.items.IndexOf(instance.item) {
      let actual = index + instance.iteration * self.items.count
      if actual < self.patchRange.begin {
         return actual
      } else if actual >= self.patchRange.end {
         return actual +self.patch.count -self.patchRange.count
      }
   }
   return nil
}
```

Example 4 illustrates an exemplary function in accordance with an embodiment, which merges changes from "update" and "modified" sequences of a cyclic list by treating "original" as a common ancestor in a three way merge. All three cyclic list sequences are assumed to contain only unique elements, and this property is preserved in the output. The algorithm is biased towards "modified", in that it treats changes made there as having higher user intent.

For example, in accordance with an embodiment, if an element is removed in "modified", then it will not appear in the output. If an element is added/moved by both "update" and "modified", then "modified" will have precedence, since it would be undesirable to add tracks that were removed or added by the modified version. As such, the merging reflects three common cases: a queue element was simply removed by "modified", meaning removal is the intent; the queue element was removed and then added, and since duplicates are to be avoided we bias towards the modified; or, the element was just added and we simply don't want duplicates.

Example 4

```
func Merge<T>(original: [T], update: [T], modified: [T] ) -> [T] {
   // The DiffIterator generates the following actions: Add, Remove, Retain
   let uit = DiffIterator(original, update)
   let mit = DiffIterator(original, modified)
   let mod = CollectModifications(original, modified)
   var merged: [T] = [ ]
   while !uit.atEnd( ) || !mit.atEnd( ) {
      switch (uit.action, mit.action) {
         case (.Remove, _) where uit.atom == mit.atom: fallthrough
         case (_, .Remove) where uit.atom == mit.atom: uit.advance( );
mit.advance( )
         case (_, .Add): merged += [mit.atom]; mit.advance( )
         case (.Add, _): if mod.contains(uit.atom) { merged += [uit.atom]; }
uit.advance( )
         default: merged += [mit.atom]; uit.advance( ); mit.advance( )
      }
   }
   return merged
}
```

As indicated previously, the functions described above are provided for purposes of illustration, to illustrate an exemplary embodiment. In accordance with other embodiments, other types of functions can be used to provide a similar functionality.

Figure 8:
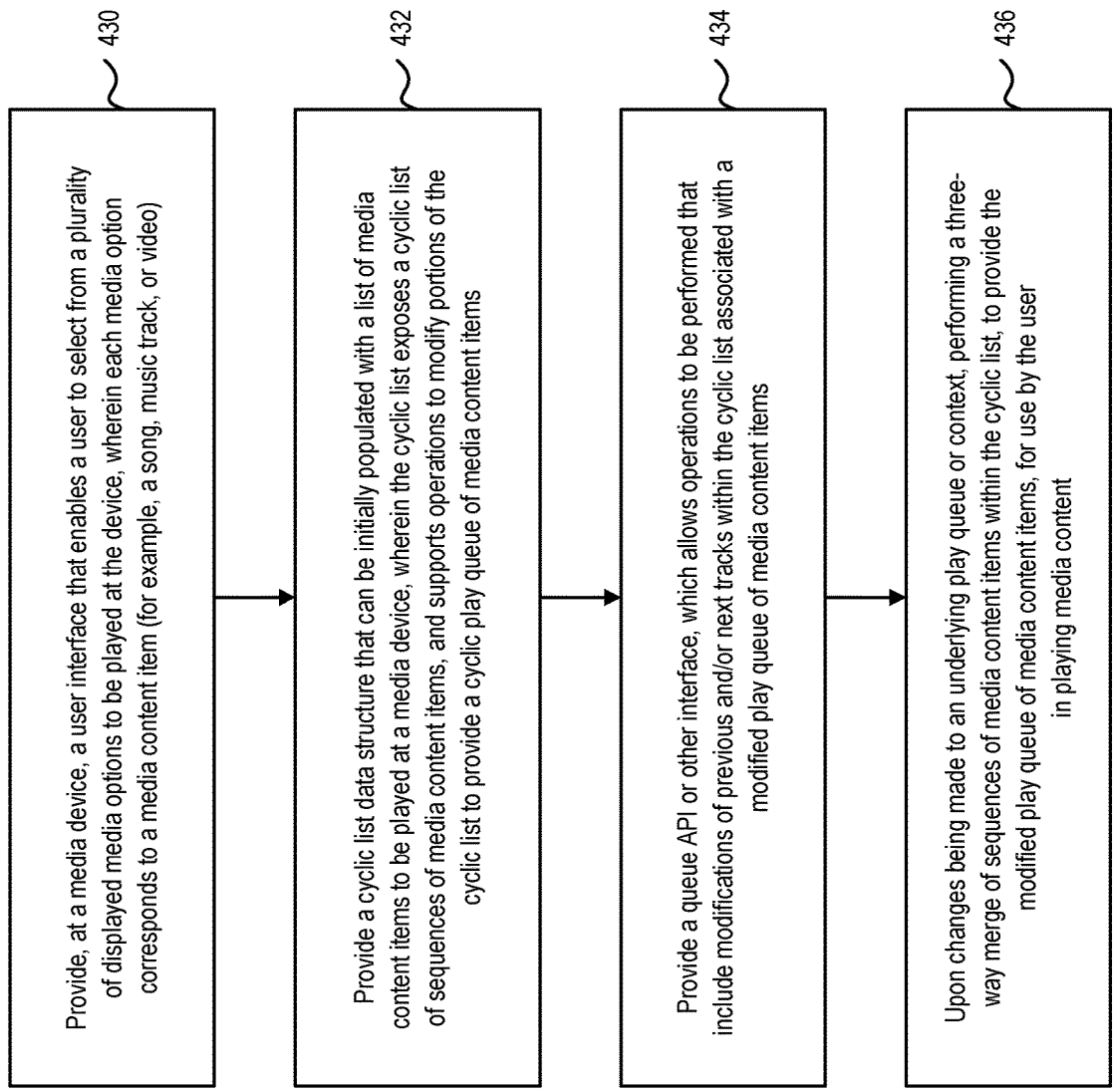
FIG. 8 illustrates a method for use of cyclic play queues in a media content environment, in accordance with an embodiment.

FIG. 8 illustrates a method for use of cyclic play queues in a media content environment, in accordance with an embodiment.

As illustrated in FIG. 8, at step 430, a user interface is provided at a media device, that enables a user to select from a plurality of displayed media options to be played at the device, wherein each media option corresponds to a media content item (for example, a song, music track, or video).

At step 432, a cyclic list data structure is provided that can be initially populated with a list of media content items (e.g., songs or tracks) to be played at a media device, wherein the cyclic list exposes a continuous list of sequences of media content items (which initially can be simply the provided list of media content items, e.g., songs, music tracks, or videos, repeated over and over again), and supports operations to modify portions of the cyclic list to provide a cyclic play queue of media content items.

At step 434, a queue API or other interface is provided, which allows operations to be performed that include modifications of previous and/or next tracks within the cyclic list associated with a modified play queue of media content items.

At step 436, upon changes being made to an underlying play queue or context, a three-way-merge of sequences of media content items within the cyclic list is performed, to provide the modified play queue of media content items, for use by the user in playing media content.

Embodiments of the present invention may be conveniently implemented using one or more conventional general purpose or specialized digital computer, computing device, server, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate use in media content environments, or with music streaming services such as Spotify, and the providing or streaming of songs or music tracks, the systems and techniques described herein can be similarly used with other types of systems, and/or to provide other types of media content or data.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method, comprising:
at an electronic device associated with a media streaming service, the electronic device comprising one or more processors and memory:
while providing a first playlist for playback by a media device, maintaining a play queue for a first user that is initially populated with a list of media content items to be played by the media device, the initially populated list of media content items including one or more media content items distinct from the first playlist and selected by the first user and one or more media content items from the first playlist;
receiving a request from the first user to change playback from the first playlist to a second playlist different from the first playlist; and
in response to the request from the first user to change the playback from the first playlist to the second playlist, maintaining, in the play queue, the one or more media content items selected by the first user while changing the playback from the first playlist to the second playlist.

2. The method of claim 1, wherein the first playlist is made by a distinct electronic device.

3. The method of claim 1, wherein the first playlist and the second playlist are curated by another user distinct from the first user.

4. The method of claim 3, further comprising:
detecting a change in the second playlist; and
in response to detecting the change in the second playlist, modifying the play queue by merging the change in the second playlist into the play queue.

5. The method of claim 1, further including:
prior to receiving the request from the first user to change playback from the first playlist to the second playlist different from the first playlist, receiving a request from the first user to move, within the play queue, a media content item from the first playlist; and
in response to the request from the first user to change playback from the first playlist to the second playlist, maintaining, in the play queue, the media content item from the first playlist that was moved within the play queue.

6. An electronic device associated with a media streaming service, the electronic device comprising:
one or more processors; and
memory storing instructions for execution by the one or more processors, including instructions for:
while providing a first playlist for playback by a media device, maintaining a play queue for a first user that is initially populated with a list of media content items to be played by the media device, the initially populated list of media content items including one or more media content items distinct from the first playlist and selected by the first user and one or more media content items from the first playlist;
receiving a request from the first user to change playback from the first playlist to a second playlist different from the first playlist; and
in response to the request from the first user to change the playback from the first playlist to the second playlist, maintaining, in the play queue, the one or more media content items selected by the first user while changing the playback from the first playlist to the second playlist.

7. The electronic device of claim 6, wherein the first playlist and the second playlist are curated by another user distinct from the first user.

8. The electronic device of claim 7, wherein the memory further stores instructions for:
detecting a change in the second playlist; and
in response to detecting the change in the second playlist, modifying the play queue by merging the change in the second playlist into the play queue.

9. The electronic device of claim 6, wherein the memory further stores instructions for:
prior to receiving the request from the first user to change the playback from the first playlist to the second playlist different from the first playlist, receiving a request from the first user to move, within the play queue, a media content item from the first playlist; and
in response to the request from the first user to change the playback from the first playlist to the second playlist, maintaining, in the play queue, the one or more media content items from the first playlist that were moved within the play queue.

10. The electronic device of claim 6, wherein the first playlist is made by a distinct electronic device.

11. A non-transitory computer-readable storage medium storing instructions for execution by an electronic device associated with a media streaming service, the non-transitory computer-readable storage medium storing instructions for:
- while providing a first playlist for playback by a media device, maintaining a play queue for a first user that is initially populated with a list of media content items to be played by the media device, the initially populated list of media content items including one or more media content items distinct from the first playlist and selected by the first user and one or more media content items from the first playlist;
- receiving a request from the first user to change playback from the first playlist to a second playlist different from the first playlist; and
- in response to the request from the first user to change the playback from the first playlist to the second playlist, maintaining, in the play queue, the one or more media content items selected by the first user while changing the playback from the first playlist to the second playlist.

12. The non-transitory computer-readable storage medium of claim 11, wherein the first playlist and the second playlist are curated by another user distinct from the first user.

13. The non-transitory computer-readable storage medium of claim 12, further storing instructions for:
- detecting a change in the second playlist; and
- in response to detecting the change in the second playlist, modifying the play queue by merging the change in the second playlist into the play queue.

14. The non-transitory computer-readable storage medium of claim 11, further storing instructions for:
- prior to receiving the request from the first user to change the playback from the first playlist to the second playlist different from the first playlist, receiving a request from the first user to move, within the play queue, a media content item from the first playlist; and
- in response to the request from the first user to change the playback from the first playlist to the second playlist, maintaining, in the play queue, the media content item from the first playlist that was moved within the play queue.

15. The non-transitory computer-readable storage medium of claim 11, wherein the first playlist is made by a distinct electronic device.

* * * * *